United States Patent [19]

Elwell

[11] Patent Number: 4,557,494
[45] Date of Patent: Dec. 10, 1985

[54] RUNNING BOARD

[75] Inventor: Dennis L. Elwell, Johnston, Iowa

[73] Assignee: Dee Zee Manufacturing, Des Moines, Iowa

[21] Appl. No.: 560,431

[22] Filed: Dec. 12, 1983

[51] Int. Cl.⁴ .............................................. B60R 3/00
[52] U.S. Cl. .................................. 280/164 R; 24/514; 362/81; 403/22; 411/87
[58] Field of Search .................... 362/81, 146; 411/84, 411/85, 87, 88, 90; 403/22; 280/163, 164 R; 24/514, 694; 248/297.2

[56] References Cited

U.S. PATENT DOCUMENTS

| | | | |
|---|---|---|---|
| 1,467,656 | 9/1923 | Sturt | 280/163 |
| 1,481,057 | 1/1924 | Gott | 362/81 |
| 1,674,713 | 6/1928 | Brooks | 52/179 |
| 1,901,869 | 3/1933 | Duffy | 280/163 |
| 2,077,822 | 4/1937 | Baker | 280/163 X |
| 2,081,899 | 6/1937 | Bridge | 362/81 |
| 2,431,735 | 12/1947 | Cyr | 411/87 |
| 3,648,749 | 3/1972 | Warren | 411/87 |
| 3,885,144 | 5/1975 | Lewis et al. | 362/146 X |
| 4,203,611 | 5/1980 | Makela | 280/163 |
| 4,311,320 | 1/1982 | Waters, Jr. | 280/163 |
| 4,463,962 | 8/1984 | Snyder | 362/81 X |

Primary Examiner—Joseph F. Peters, Jr.
Assistant Examiner—Michael Mar
Attorney, Agent, or Firm—Henderson & Sturm

[57] ABSTRACT

A running board having a series of lighting elements disposed within an enclosed cavity along the outer edge of the running board, and a mounting structure including a channel on the underside of the running board deck, which channel supports a fastener and secures the fastener against rotation by the mating engagement of a channel rib with a slot in the head of the fastener.

13 Claims, 5 Drawing Figures

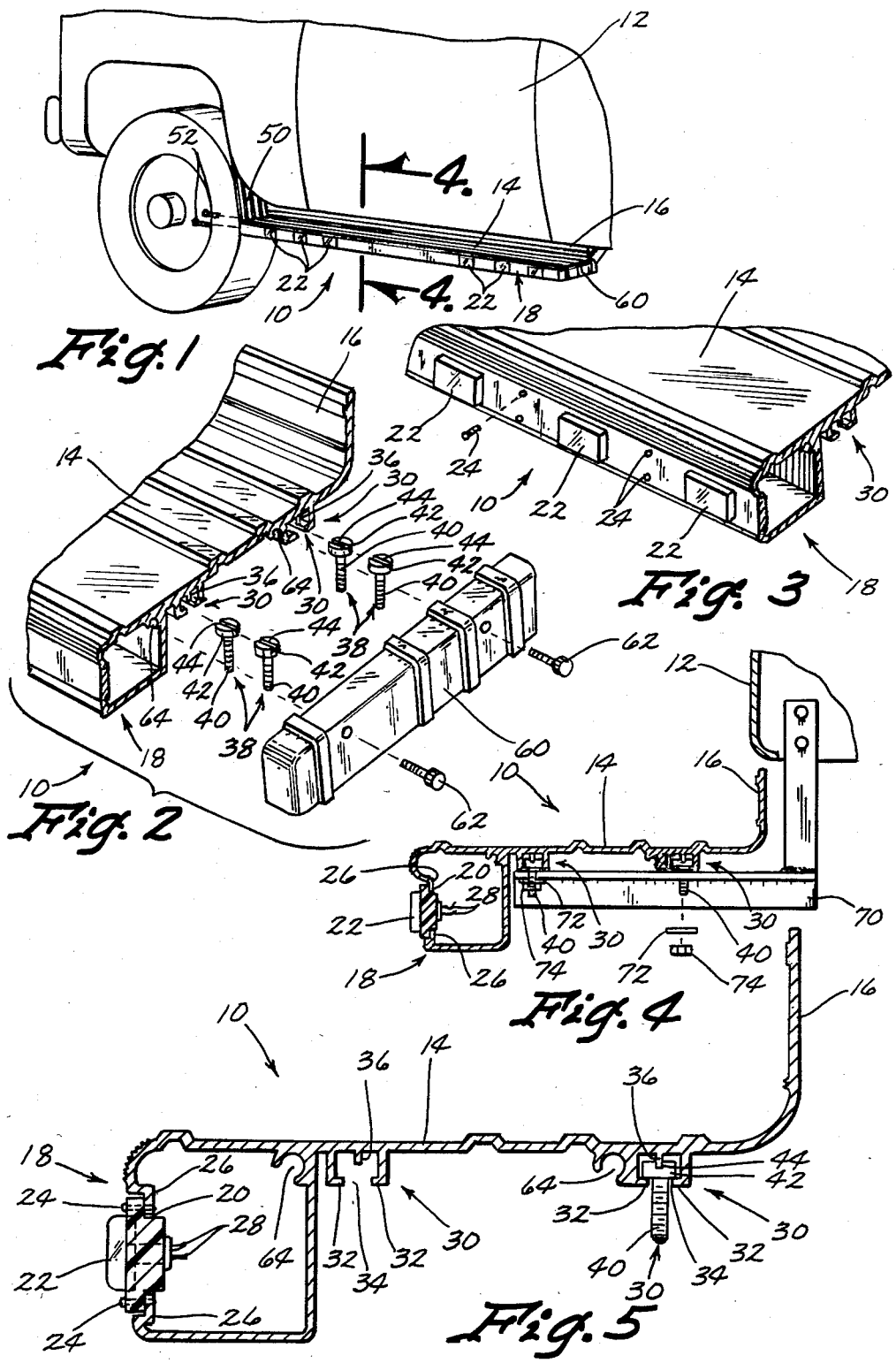

RUNNING BOARD

TECHNICAL FIELD

This invention relates to running boards of the type used in conjunction with light trucks and vans, and more particularly to a running board including a lighting element and a structure for the convenient attachment of the running board to a vehicle.

BACKGROUND ART

Various running boards have been provided which allow for convenient access to light trucks and vans. Many of these running boards, however, are difficult to install and when installed detract from the overall styling of the vehicle.

Those concerned with these and other problems recognize the need for an improved running board for vehicles.

DISCLOSURE OF THE INVENTION

The present invention provides a running board having a series of lighting elements disposed along the outer edge of the running board, which adds to the aesthetic appeal of the running board and enhances the safe use of the running board and the vehicle. Further, the present invention provides a mounting structure that allows for precise positioning of the fasteners that secure the transverse braces interconnecting the running board to the vehicle. The mounting structure is also designed such that the fasteners are not visible from the top of the running board deck, thus further enhancing the aesthetic appeal of the running board.

An object of the present invention is the provision of an improved running board for vehicles.

Another object is to provide a running board that is convenient to mount on the vehicle.

A further object of the invention is the provision of a running board that enhances the overall styling of the vehicle.

Still another object is to provide a running board having a series of lighting elements disposed along the outer edge of the running board to allow the safe use of the running board and the vehicle.

A still further object is to provide a running board that allows for precise, convenient positioning of fasteners that are not visible from the top of the running board deck.

Other objects, advantages and novel features of the present invention will become apparent from the following detailed description of the invention when considered in conjunction with the accompanying drawings.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of a running board, constructed in accordance with the present invention, attached to the body of a vehicle;

FIG. 2 is an enlarged exploded perspective view of the rearward end of the running board illustrating the positioning of the slotted head fasteners in the ribbed mounting channels, and illustrating the positioning of the end cap over the ends of the mounting channels and the end of the enclosed lighting cavity;

FIG. 3 is an enlarged perspective view showing the attachment of the lighting element to the outer edge of the deck of the running board;

FIG. 4 is an enlarged sectional view taken along line 4—4 of FIG. 1, illustrating the attachment of the running board to the vehicle by use of a transverse support; and FIG. 5 is a greatly enlarged sectional view similar to FIG. 4, showing the mating engagement of the mounting channel rib with the slot of the fastener head, which engagement prevents the rotation of the fastener in the channel when a nut is tightened on the fastener.

BEST MODE FOR CARRYING OUT THE INVENTION

Referring now to the drawings, wherein like reference numerals designate identical or corresponding parts throughout the several views, FIG. 1 shows a running board (10) attached to a vehicle (12). The running board (10) includes a substantially horizontal deck (14), an upwardly extending mounting flange (16) disposed along the inner edge of the deck (14), and a downwardly depending enclosed cavity (18) disposed along the outer edge of the deck (14).

As best shown in FIGS. 3–5, the enclosed cavity (18) has an opening (20) that extends along the outer face of the enclosed cavity (18). An electrical lighting element (22) is attached by self-tapping screws (24) to the opposing lips (26) that define the opening (20). Electrical lead wires (28) extend from the lighting element (22) into the enclosed cavity (18) where they are operably connected to the vehicle taillight wiring system (not shown).

Referring now to FIGS. 2, 4 and 5, the running board (10) includes a pair of mounting channels (30) attached to the underside of the deck (14). The mounting channels (30) extend longitudinally of the deck (14) in parallel spaced relationship. A pair of counteropposing support flanges (32) define a bottom channel opening (34), and a downwardly depending rib (36) is disposed within the channel (30) above the bottom opening (34).

As best shown in FIGS. 2 and 5, the channels (30) slideably receive fasteners (38). Each fastener (38) includes a threaded shaft (40) and an enlarged head (42) having a slot (44) formed therein. The fastener (38) is slideably received within the channel (30) such that the channel rib (36) matingly engages the slot (44) and the threaded shaft (40) extends downwardly through the bottom channel opening (36). The mating engagement of the channel rib (36) with the fastener head slot (44) prevents the rotation of fastener (38) within the channel (30).

To assemble the running board (10) and attach it to the vehicle (12), a mudguard (50) (FIG. 1) is attached to the forward end of the deck (14) by self-tapping screws (52) such that a portion of the mudguard (50) covers the forward end of the mounting channels (30) and the forward end of the enclosed cavity (18). Fasteners (38) are then positioned in the channels (30) such that the rib (36) engages the fastener slot (44) and the threaded shaft (40) extends through the channel opening (36). An end cap (60) (FIG. 2) is then secured to the rearward end of the deck (14) by self-tapping screws (62) received within bosses (64) formed in the underside of the deck (14). The end cap (60) is disposed to cover the rearward end of the mounting channels (30) and the rearward end of the enclosed cavity (18).

The running board (10) is then aligned with respect to the vehicle (12) and the mounting flange (16) is bolted to the rocker panel, and the mudguard (50) is bolted to the wheel well lip. Transverse support braces (70) (FIG. 4) are attached to the underside of the deck (14) by sliding fasteners (38) within the channel (30) to a position where the fasteners (38) are aligned with openings in the braces (70). Washers (72) and nuts (74) and then attached to the threaded shafts (40) to secure the braces (70) to the deck (14). The running board (10) is leveled and the ends of the braces (70) are attached to the vehicle (12). The lighting elements (22) are secured to the outer edge of the enclosed cavity (18) and the lead wires (28) are operably atached to the taillight wiring system of the vehicle, thus completing the installation.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A running board for a vehicle including a horizontal deck and a transverse support for attaching the deck to the vehicle, the improvement comprising:
   a rigid mounting channel extending longitudinally of said deck and attached to the underside thereof, said channel having a bottom opening formed by the spacing of counteropposing support flanges;
   a downwardly depending rib disposed within and extending along said channel above said bottom channel opening; and
   a fastener including a shaft and a head, said head having a slot formed therein, said fastener being slideable in the longitudinal direction within said channel and disposed such that said rib matingly engages said slot and said shaft depends through said bottom channel opening for attachment to said transverse support.

2. The running board of claim 1, further comprising:
   an enclosed cavity extending longitudinally of the outer edge of said deck and disposed to depend downwardly therefrom; and
   an electrically operated lighting element disposed within said enclosed cavity.

3. The running board of claim 1, further comprising a pair of said rigid mounting channels disposed in parallel spaced relationship.

4. The running board of claim 1, further comprising an upwardly extending mounting flange disposed along the inner edge of said deck and adapted for attachment to said vehicle.

5. The running board of claim 1, further comprising a mudguard attached to the forward end of said deck and disposed to cover the forward end of said mounting channel.

6. The running board of claim 1, further comprising an end cap attached to the rearward end of said deck and disposed to cover the rearward end of said mounting channel.

7. A running board for a vehicle including a horizontal deck and a transverse support for attaching the deck to the vehicle, the improvement comprising:
   an enclosed cavity extending longitudinally of the outer edge of said deck and disposed to depend downwardly therefrom;
   an electrically operated lighting element disposed within said enclosed cavity;
   a rigid mounting channel extending longitudinally of said deck and attached to the underside thereof, said channel having a bottom opening formed by the spacing of counteropposing support flanges;
   a downwardly depending rib disposed within and extending along said channel above said bottom channel opening; and
   a fastener including a shaft and a head, said head having a slot formed therein, said fastener being slideably in the longitudinal direction within said channel and disposed such that said rib matingly engages said slot and said shaft depends through said bottom channel opening for attachment to said transverse support.

8. The running board of claim 7, further comprising:
   a rigid mounting channel extending longitudinally of said deck and attached to the underside thereof, said channel having a bottom opening formed by the spacing of counteropposing support flanges;
   a downwardly depending rib disposed within said channel above said bottom channel opening; and
   a fastener including a shaft and a head, said head having a slot formed therein, said fastener being slideable within said channel and disposed such that said rib matingly engages said slot and said shaft depends through said bottom channel opening for attachment to said transverse support.

9. The running board of claim 8, further comprising a pair of said rigid mounting channels disposed in parallel spaced relationship.

10. The running board of claim 8, further comprising an upwardly extending mounting flange disposed along the inner edge of said deck and adapted for attachment to said vehicle.

11. The running board of claim 8, further comprising a mudguard attached to the forward end of said deck and disposed to cover the forward end of said mounting channel.

12. The running board of claim 8, further comprising an end cap attached to the rearward end of said deck and disposed to cover the rearward end of said mounting channel.

13. A running board for a vehicle including a horizontal deck and a transverse support for attaching the deck to the vehicle, the improvement comprising:
   an enclosed cavity extending longitudinally of the outer edge of said deck and disposed to depend downwardly therefrom;
   an electrically operated lighting element disposed within said enclosed cavity;
   a pair of rigid mounting channels extending longitudinally of said deck and attached to the underside thereof in parallel spaced relationship, each of said channels having a bottom opening formed by the spacing of counteropposing support flanges;
   a downwardly depending rib disposed within each of said channels above said bottom channel opening;
   a plurality of fasteners each including a shaft and a head, said head having a slot formed therein, said fasteners being slideable in the longitudinal direction within said channel and disposed such that said rib matingly engages said slot and said shaft depends through said bottom channel opening for attachment to said transverse support;

an upwardly extending mounting flange disposed along the inner edge of said deck and adapted for attachment to said vehicle;

a mudguard attached to the forward end of said deck and disposed to cover the forward end of said mounting channels; and and end cap attached to the rearward end of said deck and disposed to cover the rearward end of said mounting channels.

* * * * *